Nov. 16, 1954 M. LEHMANN 2,694,460
CONTROL MECHANISM FOR TRUCKS
Original Filed Sept. 30, 1948 5 Sheets-Sheet 1

INVENTOR.
MAX LEHMANN
BY
Geo. B. Pitts
ATTORNEY

Nov. 16, 1954

M. LEHMANN 2,694,460

CONTROL MECHANISM FOR TRUCKS

Original Filed Sept. 30, 1948

INVENTOR.
MAX LEHMANN
BY
Geo. B. Pitts
ATTORNEY

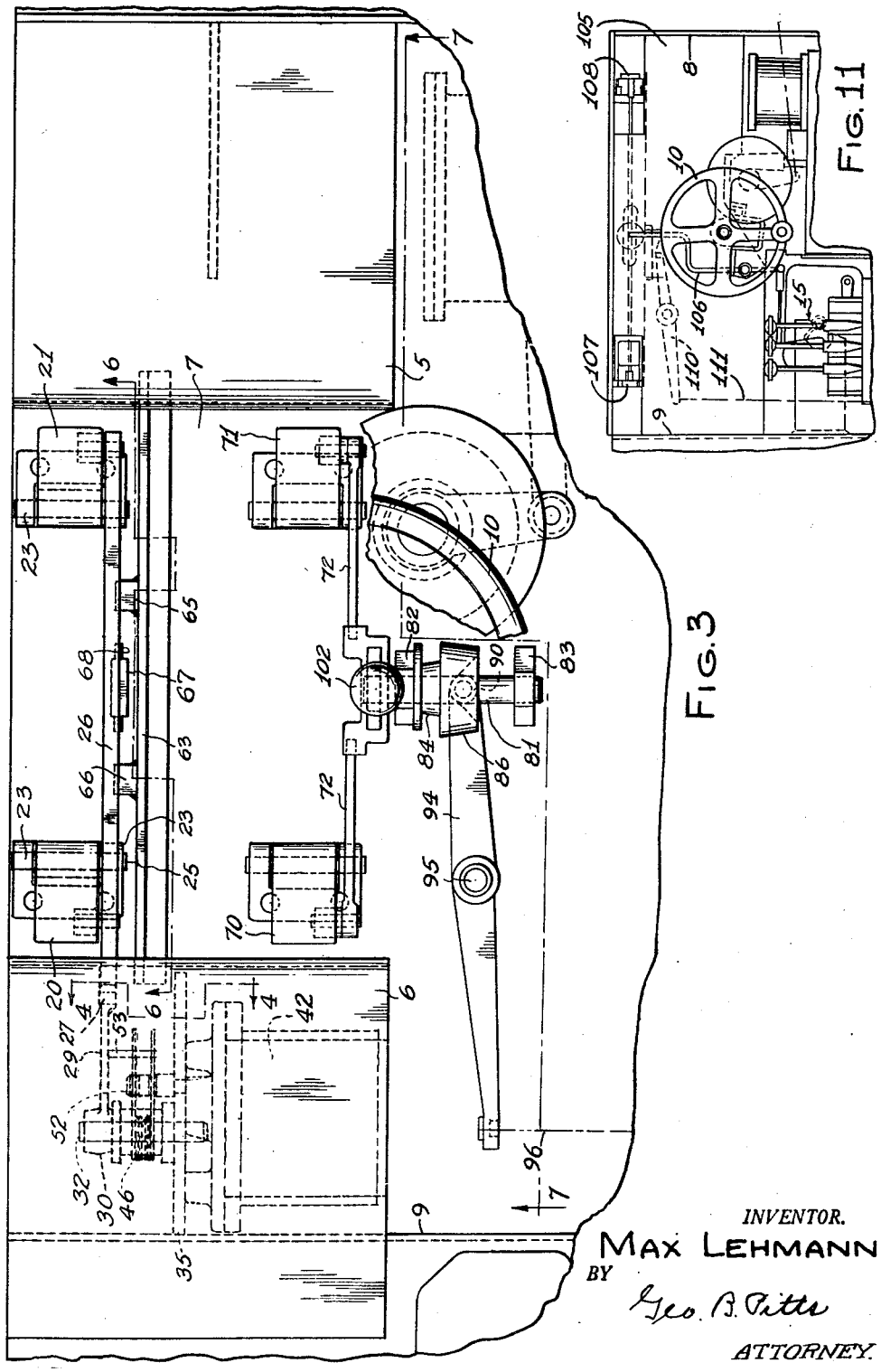

Nov. 16, 1954  M. LEHMANN  2,694,460
CONTROL MECHANISM FOR TRUCKS
Original Filed Sept. 30, 1948  5 Sheets-Sheet 4
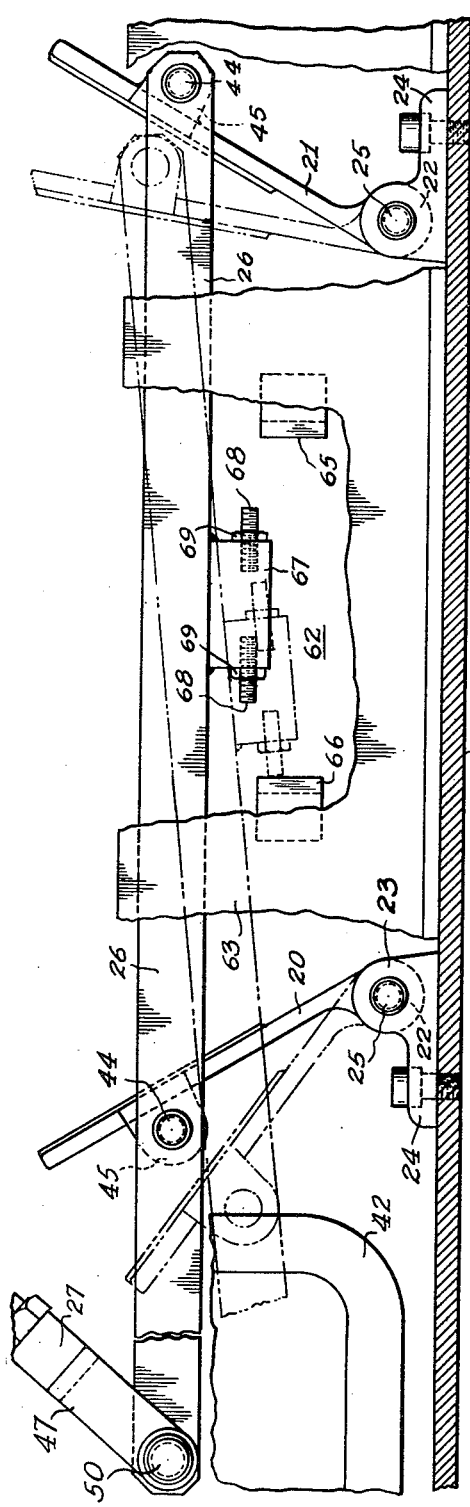
Fig. 6
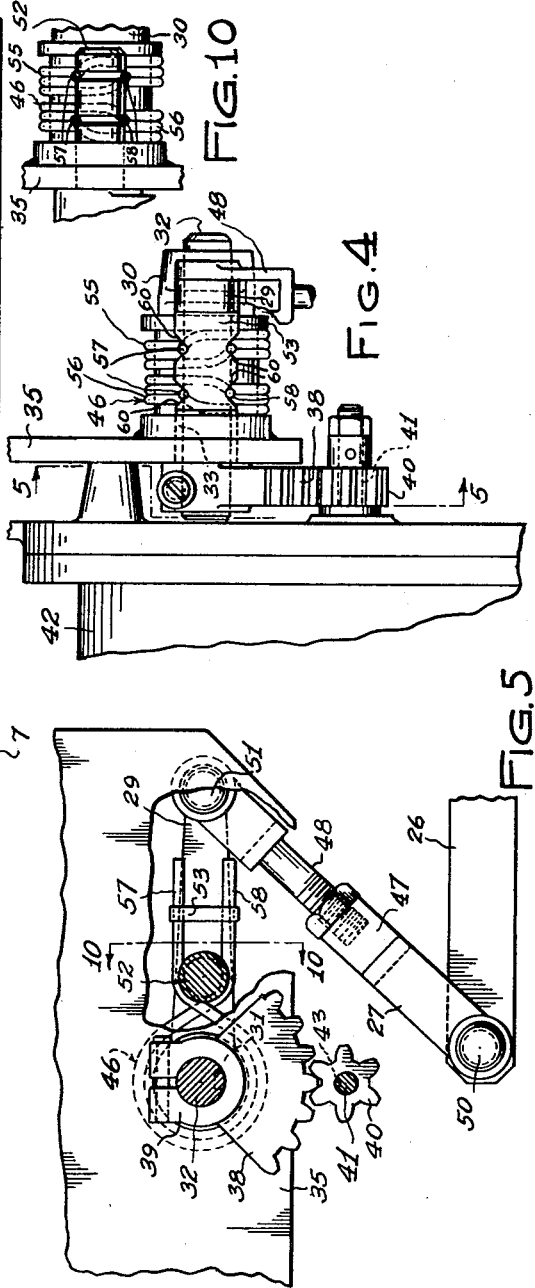
Fig. 10
Fig. 4
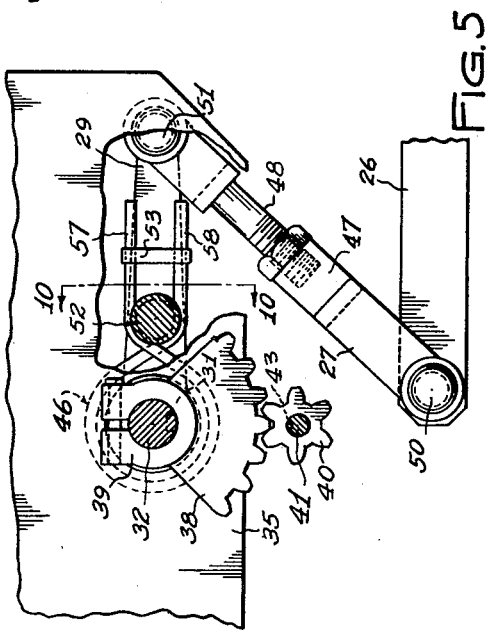
Fig. 5
INVENTOR.
Max Lehmann
BY
Geo. B. Pitts
ATTORNEY.

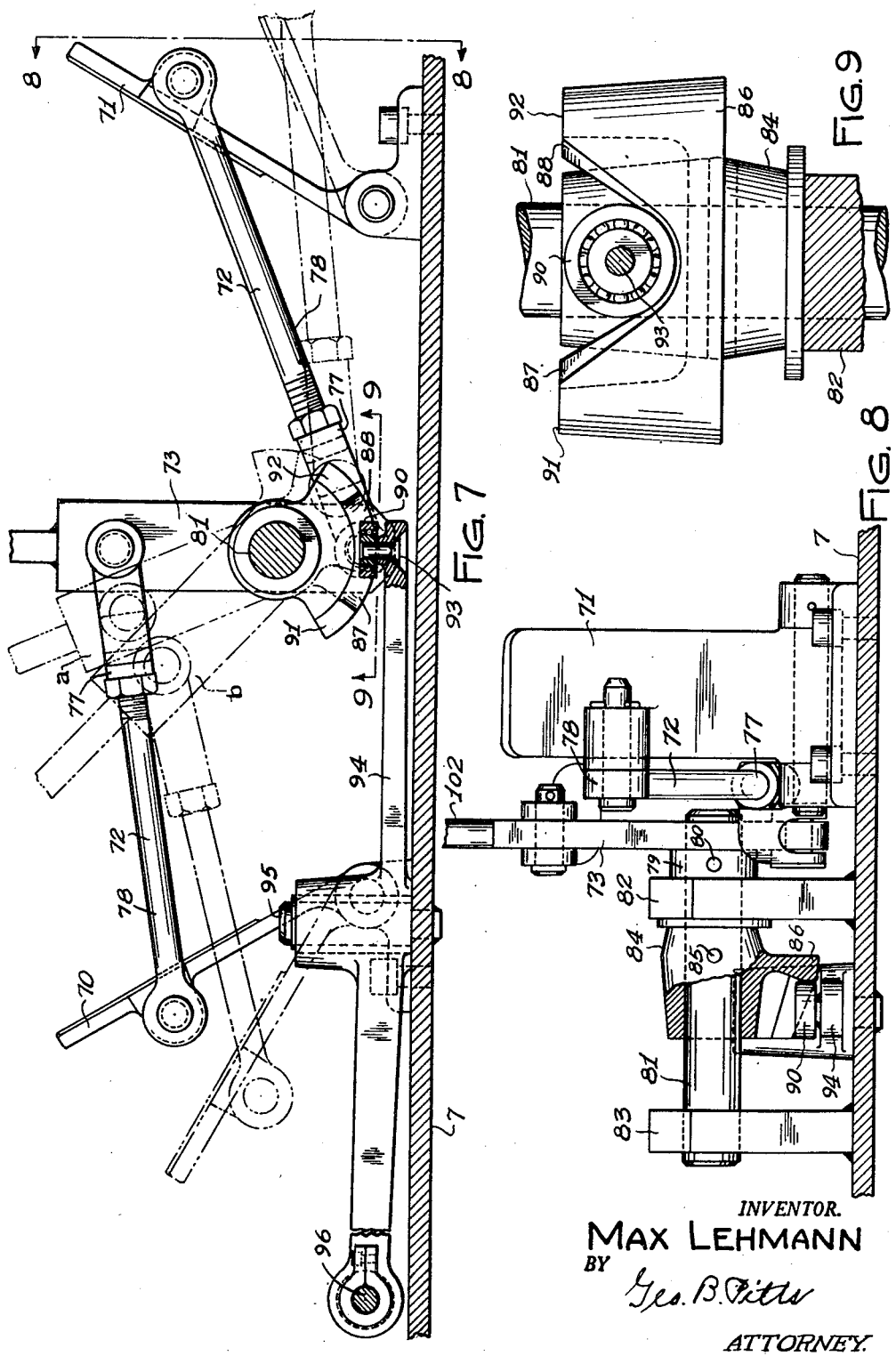

United States Patent Office 2,694,460
Patented Nov. 16, 1954

2,694,460
CONTROL MECHANISM FOR TRUCKS

Max Lehmann, East Cleveland, Ohio, assignor to The Baker-Raulang Company, Cleveland, Ohio, a corporation of Ohio Original application September 30, 1948, Serial No. 51,979 now Patent No. 2,689,662, dated September 21, 1954. Divided and this application August 9, 1950, Serial No. 178,540

11 Claims. (Cl. 180—77)

This invention relates to a power driven truck advantageously operable in mines, that is, driven into and through the main entry, panel entry and block room of a mine. The truck is particularly adapted for handling and positioning timber and bars for the mine roofs where excavations in the mine have been completed, the truck having a boom for raising the timbers and maintaining them in accurate elevated relation to the mine roof while props therefor are being cut and placed in position. The chassis of the truck is constructed to support the truck platform at a low level. The power supply and power mechanisms are mounted below the platform, and as the boom may be disposed in a horizontal position during truck travel, the overall height of the truck is reduced, so that it may be driven through mine areas and the boom operated where overhead conditions are limited.

Due to the fact that the truck is employed under conditions requiring it to be driven long distances through narrow passageways, provision is made for driving it forwardly and rearwardly in a ready manner by an arrangement of control elements, whereby the driver can always face the direction of travel. Such arrangement not only enables faster travel of the truck but eliminates unforeseen dangers to life and other accidents.

One object of the invention is to provide in a power driven vehicle improved mechanically-operated mechanism for controlling translatory movement of the vehicle and which is mounted at a control station and associated with spaced opposed supports for a driver, whereby the latter may face the direction in which the truck is being driven.

Another object of the invention is to provide in a truck having a motor for driving it and a brake, duplictae operating devices for controlling the operation of the motor and brake, respectively, positioned at a control station, corresponding operating devices for the motor and brake being related to the respective seats for the driver, whereby the latter, when driving the truck in either direction can face the direction in which it is travelling.

A truck of this type, when used in a mine, must often be driven long distances to and from the location where work and installaitons are to be made and as the truck cannot be turned around it has to be backed to a place of a parking or to another location; accordingly, another object of the invention is to provide improved dual operating devices for driving, braking, parking of the truck disposed in a control station at one side and below the level of the platform, whereby the driver may face forwardly or backwardly dependent upon the direction the truck is to be driven.

Another object of the invention is to provide an improved truck having a driving mechanism and a brake, spaced seats for a driver and separate, side-by-side connected-together dual control devices between the seats for operating the driving mechanism and the brake.

Other objects of the invention will be apparent to those skilled in the art to which my invention relates from the following description taken in connection with the accompanying drawings, wherein Fig. 1 is a plan view of a truck embodying my invention with the outer portion of the boom being omitted;

Fig. 3 is a fragmentary plan view of the control station, enlarged;

Fig. 4 is a fragmentary elevation on the line 4—4 of Fig. 3;

Fig. 5 is an enlarged section on the line 5—5 of Fig. 4;

Fig. 6 is a section on the line 6—6 of Fig. 3;

Fig. 7 is a fragmentary section substantially on the line 7—7 of Fig. 3, enlarged and parts being broken away;

Fig. 8 is a view on the line 8—8 of Fig. 7, parts being broken away.

Fig. 9 is a section on the line 9—9 of Fig. 7; and

Fig. 10 is a section on the line 10—10 of Fig. 5; and

Fig. 11 is a fragmentary plan view showing a modified form of construction.

Figure 1:
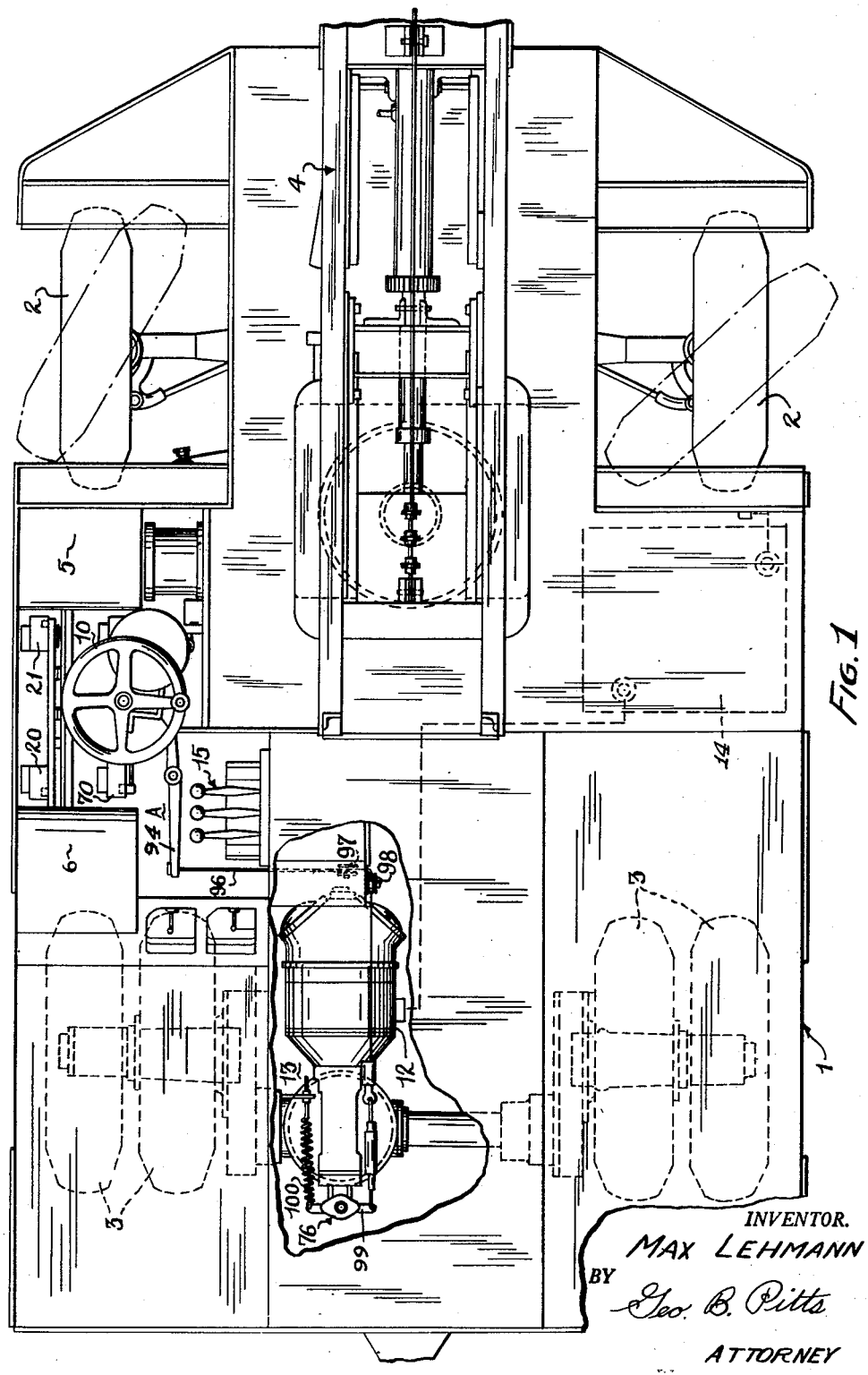

Referring to the drawings, the invention is illustrated as embodied in a truck having a chassis, generally designated by the reference numeral 1, supported on a pair of steerable front wheels 2 and rear traction wheels 3. The front wheels 2 may be connetced to the chassis 1 and steerable by the mechanism disclosed and described in detail in my copending application Serial No. 51,979, filed September 30, 1948, the particular structure of the steering mechanism not forming a part of the present invention except as hereinafter set forth. At one side of the chassis 1 and intermediate the front and rear wheels, a control station A is provided having associated therewith or therein (a) various devices and levers, the opertaion of which, through valves and other devices, effect driving and braking of the truck and operation of a boom 4 supported on the forward part of the chassis 1, and (b) front and rear seats 5 and 6, respectively, for the driver, the control station including a floor 7 located adjacent the underside of the chassis 1 and connected at its opposite ends to the lower ends of spaced vertical members 8, 9 supported by the chassis and forming the end walls of the control station A. The spaced vertical members 8, 9 support the seats 5, 6, respectively.

The control station A includes a steering element or wheel 10 for controlling the operation of the steerable wheels 2 through any suitable steering mechanism. The steering wheel 10 is supported in a horizontal plane from a longitudinal side wall 11 of the control station A approximately midway between the front and rear seats 5 and 6 so that it is operable by the driver when occupying either of the seats. Power means comprising an electric motor 12, in the illustrated embodiment, for driving the traction wheels 3 is located in a compartment 13 adjacent the control station A. The particular mechanism of the power means interconnecting the motor 10 and the traction wheels 3 forms no part of the present invention and, therefore, will not be described in detail. The power means includes a battery 14 adapted to be connected to the motor 10 by control means to be described in detail hereinafter.

The boom 4 is preferably mounted by suitable mechanism, not shown, for bodily movement endwise, movement about a vertical axis on the chassis 1 and for swingable movement upwardly and downwardly and is provided at its outer end with a cradle, not shown. The operation of the boom is controlled from station A by devices indicated at 15.

As already set forth, provision is made in the control station A for the driver, when he is occupying either seat 5, 6, to control the operation of the traction motor 12 and the braking of the truck travel and stoppage thereof. The means for controlling the operation of the motor 12 and the braking of the truck include elements adapted to be manually engaged by the driver and similarly related to the seats 5, 6, so that operation and control of the truck is facilitated when the driver is in either seat.

The control means for the traction motor 12 comprises the following: 20, 21, indicate foot pedals each provided at its lower end with a knuckle 22 fitting between hollow bosses 23 formed integrally with a base 24 and pivotally connected by a pin 25 extending through the knuckle and bosses. The bosses 23 are suitably fixed to the floor 7. The pedal 20 is adapted to be engaged by the right foot of the driver when he occupies seat 5, whereas the pedal 21 is adapted to be engaged by the left foot of the driver when he occupies the seat 6. The pedals 20, 21, are connected together by a link 26, one end of which (that end remote from the pedal 21) is pivotally connected to the outer end of a link 27. The opposite end of the link 27 is pivotally connected to an arm 29 having a hub 30 which is suitably keyed as indicated at 31 to the outer end of a shaft 32. The shaft 32 extends through and rotates in a bearing 33 mounted in a wall 35 which is rigidly connected to and depends from the seat 6. The shaft 32 is operatively connected to a controller which controls the operation of the traction motor 12. The inner end of the shaft 32 is provided with a segmental gear 38 integrally formed with a circular clamp 39 which encircles and fixes the gear 38 to the shaft 32. The segmental gear is in mesh with a pinion 40, the latter in turn being suitably keyed to a controller shaft 41 extending outwardly of a motor controller casing 42, as indicated at 43. The motor controller casing 42 houses a controller for controlling the application of power from the battery 14 to the traction motor 12 and is supported above the flooring 7 adjacent to the wall 35. The controller shaft 41 extends outwardly of the casing 42 and has the pinion 40 secured to the outer end thereof. It will be seen that the controller within the controller casing 42 and the shaft 32 operatively connected to the controller by shaft 41 and pinion 40 constitute a means for controlling the application of power to the motor 12, the means being actuated by the depression of pedals 20, 21 operatively connected to the shaft 32.

The connection between the link 26 and each pedal 20, 21 consists of a headed pin 44 extending through an opening formed in the link and a hollow boss 45 welded to the under side of the adjacent pedal. Spring means, indicated as an entirety at 46, preferably connected to the arm 29, operates to normally maintain the latter in neutral position and, through the link 27 and link 26, to support the pedals 20, 21 in normal or inoperative position. As shown, the link 26 and arm 29 are normally disposed horizontally and in parallel relation and the link 26 is moved substantially endwise when foot pressure is applied to either pedal 20, 21, to swing it about its pivot 25, whereas the link 27 is normally disposed at a substantially 30° angle to the arm 29 and link 26. In this arrangement it will be observed that (a) when the driver is occupying seat 6 and pushes pedal 21 clockwise (as viewed in Fig. 6), arm 29 will be swung counter-clockwise, the effect of which is to rotate the controller shaft 41 clockwise and drive the motor 12 in a direction to propel the truck in the forward direction; and (b) when the driver occupies the seat 5 and pushes pedal 20 counter-clockwise, the arm 29 will be swung clockwise, so that the controller shaft 41 will be rotated in the opposite direction and propel the truck rearwardly. By preference the link 27 consists of two endwise related sections 47, 48. The outer ends of the sections 47, 48, are bifurcated and pivotally connected to the adjacent end of the link 26 at 50 and outer end of the arm 29 at 51, respectively, whereas the inner end of the section 47 is formed with an inwardly extending screw threaded opening to adjustably receive the threaded shank on the inner end of the section 48, so that when the arm 29 is in neutral position, both pedals 20, 21, will be disposed in diverging relation and in the same angular relation to the flooring 7.

The spring biasing means 46 preferably comprises a projection or fixed stop 52 on the outer side of the wall 35 disposed in a horizontal plane through the arm 29 when the latter is in neutral or normal position, a tensioning element or movable stop 53 extending laterally inwardly from the arm 29 to the right of the projection 52 as viewed in Fig. 5, and a pair of springs 55, 56 telescoped over the outer wall of the bearing 33. The springs 55, 56 are located side-by-side on the outer wall of bearing 33 and with the intermediate portion of the springs being coiled about the bearing wall, the opposite ends 57, 58 of each spring 55, 56 extending outwardly over oppositely disposed portions of the projection 52 and tensioning element 53. The extended end portions 57, 58, of the springs leading from the upper and lower sides of the wall of the bearing 33 are bent in opposite directions and engage the lower and upper sides, respectively, of the projection 52 and outwardly of the latter the end portions 57, 58, are seated in notches 60 formed in the upper and lower edges of the tensioning element 53. In the arrangement shown and above described, it will be observed that when the arm 29 is operated in either direction, the tensioning element 53 will move and flex the end portions 57 of the springs 55, 56 against the projection 52 in opposition to the tension of the wires, whereas the other end portions of the springs will be held by the projection 52. Accordingly, with the stored energy in the end portions of the two springs, upon release of pressure on the operated foot pedal, the springs 55, 56 will return the arm 29, links 27, 26 and pedals 20, 21 to normal position.

Limit means, indicated as an entirety at 62, are provided for limiting the swinging movement of the pedals 20, 21, when either one is operated, so as to prevent angular movement of the controller drum beyond a predetermined position. The means 62 are preferably provided between the link 26 and an upstanding wall 63 fixed to the floor 7 and disposed parallel to the link 26. A pair of spaced abutments or stops 65, 66 are fixed to and project laterally from the face of the wall 63 between the pedals 20, 21. An abutment or block 67 is welded to and depends from the link 26 and is disposed intermediate and is substantially equally spaced from the stops 65, 66, when the pedals are in normal position. The block 67 may engage either stop dependent on the direction of movement of the link 26. In order to regulate the movement of the controller drum, the opposite ends of the block 67 are provided with adjustable devices consisting of screw threaded rods 68 threaded into threaded openings formed in the ends of the block 67 and projecting therefrom. Each of the rods is locked in adjusted position by a nut 69. By loosening the nuts, the rods 68 can be turned, the effect of which is to adjust them endwise for engagement with the stops, and thus regulate the movement of the pedals by the driver. It will be observed that where error occurs in positioning the block 67 on the link 26, the rods 68 may be adjusted different distances to compensate for such error.

Figure 2:
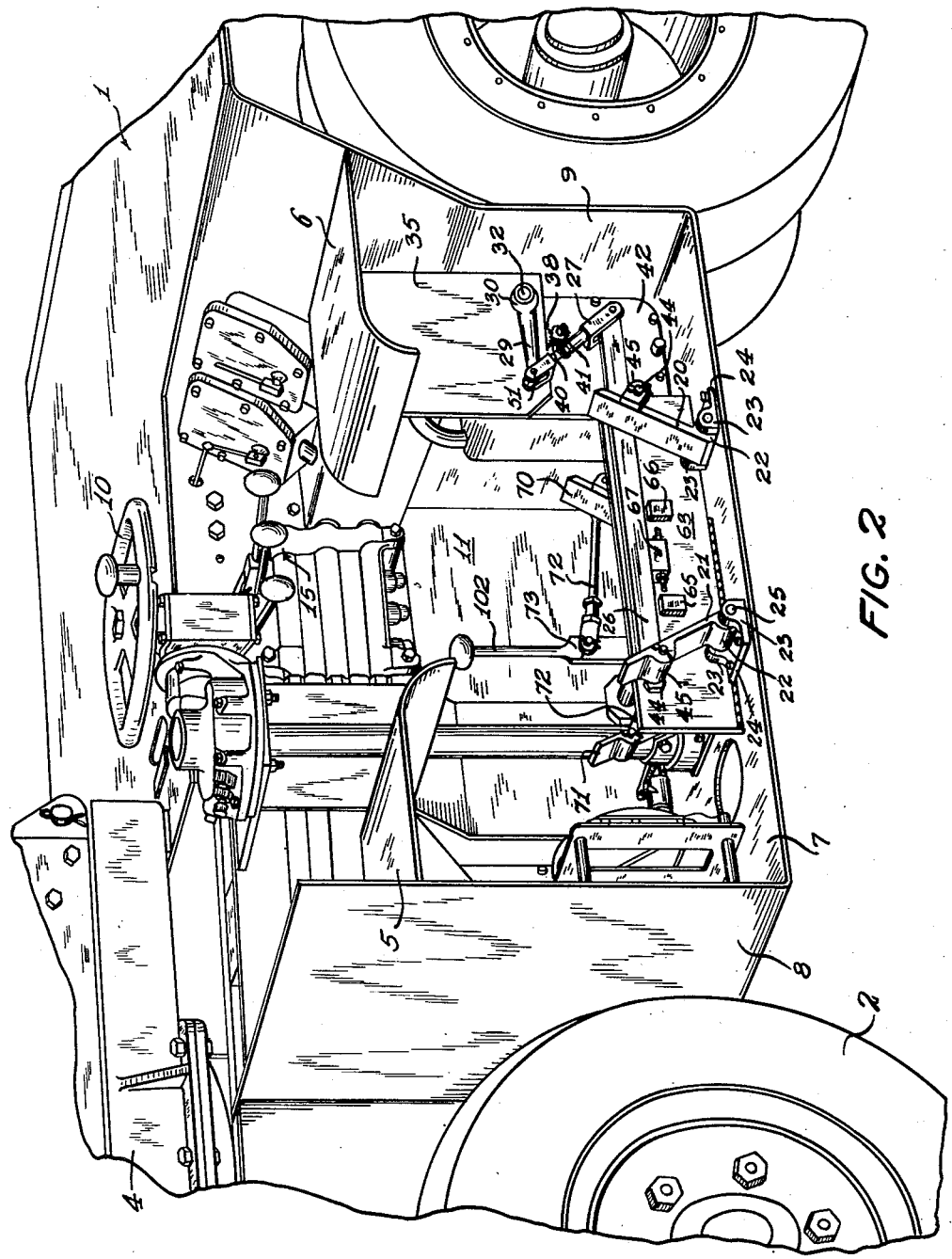
Fig. 2 is a perspective view (somewhat diagrammatic) of the control station for controlling the operation of the truck.

The means for applying the brakes comprise the following: 70, 71, indicate pedals mounted on the floor 7 similarly to the pedals 20, 21, and inclined at the same angle and preferably each in transverse alinement to one of the latter pedals. In this arrangement, when the driver is occupying the seat 6, he uses his right foot to engage and swing the pedal 71 in a counterclockwise direction, as viewed in Fig. 2, to brake the movement of the truck and when the driver is occupying the seat 5, he uses his left foot to engage and swing the pedal 70 in a clockwise direction, as viewed in Fig. 2, to brake the travel of the track.

From the foregoing description it will be observed that the steering wheel 10 is disposed substantially midway the seats 5, 6, and that each set of pedals 20, 70 or 21, 71 bears the same relation to the seat remote therefrom, so that the operation of the devices to control the driving of the truck is facilitated when the driver is in either seat 5 or seat 6. Each pedal 70, 71 is pivotally connected to the outer end of a link 72. The inner ends of the links 72 are pivotally connected to a rocker member or lever 73 at opposite sides of a shaft 81, which provides a fulcrum for the lever 73, so that when either pedal 70 or pedal 71 is operated to apply a brake 76, which is shown in Fig. 1, the lever 73 is swung or rocked in the same direction. The lever 73 serves as one of the operating connections between the links 72 and the brake 76 to operate the latter and to set the brake in parking position and to release the brake for operation as later set forth. By preference each link 72 consists of endwise related sections 77, 78. The outer end portion of each section 77, 78 is offset and bifurcated and pivotally connected to the lever 73 (see Fig. 8), whereas the inner end of each section is formed with an inwardly extending screw threaded opening to adjustably receive the inner threaded end portion of the adjacent section 78, whereby the pedals 70, 71 may be disposed at the same inclination relative to the floor 7. The lever 73 is provided at one side with a collar 79 which is fixed to a shaft 81 by a pin 80. The shaft 81 is mounted in spaced standards 82, 83. Between the standards 82, 83, the shaft 81 is provided with a member or collar 84 which is fixed to the shaft 81 by a pin 85 and has at one side a segmental wall 86, one face of which is recessed to form converging walls 87, 88, connected at their inner ends and forming a seat for a roller element 90. The walls 87, 88 operate as cams and terminate in rests 91, 92, the purpose of which will later be set forth. The roller 90 is mounted, preferably by anti-friction bearings, on a stud shaft 93 mounted on one end of a rocker 94 and is adapted to ride one of the cams 87, 88 upon rotation of the shaft 81. The rocker 94 is mounted on a shaft 95 suitably supported on the floor 7. The opposite end of the rocker 94 is connected to one end of a cable 96 engaging pulleys 97, 98, and connected at its opposite end to a movable member 99 of the brake 76, which member is movable to operate the brake and is biased by a spring 100 into a brake-released position. Operation of either pedal 70, 71, serves to swing the lever 73 to the position shown in dotted lines at *a* (Fig. 7) and rotate shaft 81; in this operation the wall 86 revolves with the shaft 81 in one direction causing the roller 90 to ride the adjacent wall or cam 87 or 88, the effect of which is to rock the rocker 94 and apply the brake 76. By operating the operated pedal 70 or 71 to swing the lever 73 to the position shown in dotted lines at *b* in Fig. 7, the roller 90 rides onto the adjacent rest 91 which locks the lever 73 against movement under the influence of the brake spring 100, thereby setting the brake 76 so as to park the truck. It will be observed that when the pedals are operated to the parking position, as indicated at *b* in Fig. 7, the pedals 20, 21, are inoperative; further movement of either pedal in the brake applying direction is ineffective and the spring 100 is ineffective so long as the rest 91 is disposed in the path of swinging movement of the roller 90. For the purpose of resetting the cam 87 and repositioning the pedals 70, 71 in normal position, the lever 73 is provided with an extension 102 having a knob at its upper end adapted to be grasped by the driver, whereby he can swing the lever 73 back to normal position, the effect of which is to rotate the collar 84 and move the rest 91 out of engagement with the roller 90, and thus permit the brake spring 100 to release the brake 76 and return the pedals.

It will be observed that both walls 88, 87 may serve as cams so that if the lever 73 is operated clockwise for any reason, the rocker 94 will be rocked and the brake 76 applied.

Fig. 11 shows a modified form of construction, wherein seats for the driver in the control station A are not employed, but the driver in driving the truck forwardly sits on the floor 105 with his back braced against the adjacent wall 9, and in driving the truck rearwardly the driver sits on the floor 105 with his back braced against the vertical member 8.

106 indicates a lever having at one end a handle disposed centrally of the station and adapted to be operated by the driver when he is in either driving position. The opposite end of the lever 106 is connected by linkage with a suitable controller for controlling current from a suitable power supply on the chassis to the motor 12 which drives the wheels 3. 107, 108, indicate foot pedals suitably mounted on the floor 105, both pedals being connected together and to one end of a rocker 110. The opposite end of the rocker 110 is connected by a cable 111 to the brake 76 in the same manner as the first-described embodiment. When the driver is in forward driving position he operates pedal 108 with his left foot to effect braking and when the driver is in rearward driving position he operates the pedal 107 with his right foot to effect braking.

This application is a division of my application filed September 30, 1948, Ser. No. 51,979, now Patent No. 2,689,662, dated September 21, 1954.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck having a chassis mounted on traction and steerable wheels, power supply means on said chassis, driving means for said traction wheels including a motor to be driven from said power supply means, controlling means on said chassis for controlling the application of said power supply means to said motor for operating the latter, a control station comprising a flooring supported by said chassis and front and rear means above said flooring providing seats for a driver, an element at said station disposed substantially midway between said seat means operatively connected to said steering wheels for operating the latter, a pair of pedals comprising forward and rearward pedals pivotally mounted on said flooring, each pedal being adapted to be operated when the driver occupies one of said seats, a link pivotally connected to said pedals, means connecting said link to said controlling means for operating the latter, and stop means for limiting the movement of said link comprising spaced first abutment means and second abutment means intermediate said spaced first abutment means adapted to engage and cooperate with said spaced first abutment means to limit the movement of said link, one of said abutment means being supported on said link and the other of said abutment means being supported on said chassis.

2. In a truck, the combination of a chassis mounted on traction and steerable wheels, a motor mounted on said chassis for driving said traction wheels, a power supply on said chassis for said motor including a rotatable shaft for operatively connecting said power supply to said motor, an arm fixed to said shaft for rotating the latter in either direction, a control station consisting of a flooring on said chassis and oppositely facing front and rear seats adapted to be selectively occupied by a driver, a pair of alined pedals pivotally mounted on said flooring between said seats, connections between said pedals and said arm for operating the latter in either direction upon movement of said pedals, each of said pedals being adapted to be operated by the driver when the latter occupies a corresponding one of said seats, a stop fixedly mounted on said chassis and disposed at one side and in the plane of said arm when the latter is in its neutral position, a stop on said arm outwardly of said first mentioned stop, a spring coiled around said shaft, each end portion of said spring being extended and offset from the other end portion, said end portions engaging oppositely disposed sides of said stops when said arm is in its neutral position and cooperating with each other to maintain said arm in its neutral position, one end portion of said spring being movable with said stop on said arm when said arm is moved in one direction with the other end portion of said spring being held against movement by said first-mentioned stop, whereby said spring is put under tension.

3. In a truck, the combination of a chassis mounted on pairs of traction and steerable wheels, a control station on said chassis having a flooring and opposed supporting means for a driver, a power operated means on said chassis for driving said traction wheels, a brake for braking said traction wheels including a movable member for actuating the brake, a pair of pedals comprising forward and rearward pedals mounted on said flooring between said driver supporting means, and mechanical connections between said pedals and said movable member for moving the latter to actuate said brake upon the movement of either one of said pedals, said mechanical connections comprising a rockshaft mounted on said flooring intermediate said pedals for rotation about its axis, a first member fixed to said shaft, links connecting said pedals to said first member at opposite sides above and below the axis of said shaft to rotate the latter when either pedal is operated, a second member fixed to said shaft, said second member having on one side thereof a pair of cams extending outwardly therefrom, an element engaging said cams and operatively connected to said movable member, said element riding one of said cams to move said movable member to operate said brake when either of said pedals is operated to rock said cams, and spring means operatively connected between said movable member and said chassis for urging said movable member and said second member through said element to a normal brake-released position when said element is in engagement with either of said cams and for yieldably urging said element into engagement with said second member.

4. A truck as claimed in claim 3 wherein the outer end of each of said cams terminates in a surface to be engaged by said element, said surface being in a plane normal to the axis of said rockshaft and opposing the force of said spring means tending to return said element and said second member to a normal brake-released position whereby said brake is set in parked position, and a handle connected to said first member for moving said surface out of engagement with said element.

5. A truck for translation in a mine and like areas and having in combination, a chassis, pairs of traction and steerable wheels for supporting the opposite ends of said chassis, a control station provided with a floor and opposed seats for a driver, a power means on said chassis for driving said traction wheels, a brake for braking said traction wheels, including a member movable to operate the brake, a spring means operatively connected between said chassis and said member urging said member to a brake-released position, a pair of alined pedals pivotally mounted on said floor for movement about parallel axes, a rock shaft mounted on said floor between and parallel to the pivot axes of said pedals, a lever fixedly connected intermediate its ends to said rock shaft, links connecting said pedals to said lever at opposite sides above and below the axis of said rock shaft, and means interconnecting said lever and said member including cam means connected to said rock shaft and actuated by the rocking of said rock shaft on the operation of either pedal and linkages interconnecting said cam means and said member to operate said brake upon the actuation of said cam means by the rocking of said rock shaft.

6. In a truck operable in excavated areas having, in combination, a chassis supported at its opposite ends on pairs of traction and steerable wheels, a control station at one side of said chassis comprising a flooring and seats for a driver which are disposed at the opposite ends of said flooring and supported in forwardly and rearwardly facing directions, power means on said chassis for driving said traction wheels, rotatable control means for controlling the operation of said power means, a brake for said traction wheels, first and second pairs of forwardly and rearwardly alined pedals pivotally mounted in side by side relation on said flooring between said seats, the pivot for each pedal of one pair and the adjacent pedal of the other pair being equally spaced from the seat remote thereto, a link pivotally connected to the first pair of pedals and operatively connected to said rotatable control means for operating the latter upon movement of the pedals, a rocker member mounted on said chassis, linkages between the pedals of the second pair of pedals connected to said rocker member at opposite sides of and above and below the fulcrum therefor, whereby operation of either pedal of said second pair of pedals operates said rocker member in one direction, and a cam operated device connected to said rocker member for actuation upon movement thereof and operatively connected to said brake for operating the latter when said rocker member is operated in either direction.

7. In a truck having, in combination, a chassis supported on pairs of traction and steerable wheels, an electric motor on said chassis for driving said traction wheels, a power supply on said chassis for said motor, circuit means connecting said power supply and said motor and including a controller, forwardly and rearwardly facing seats for a driver on said chassis, swingable arm connected to said controller for operating said controller in opposite directions, spring means connected between said arm and said chassis for resisting swinging movement of said arm in either direction from a neutral position, a pair of alined spaced pedals pivotally mounted on said chassis between said seats, an endwise movable link pivotally connected to said pedals and disposed substantially parallel and in overlapping relation to said arm and a connecting link pivotally connected at its opposite ends to the overlapping end of said endwise movable link and the outer end of said arm respectively, whereby endwise movement of said link will swing said arm in either direction dependent on the direction of movement of said link.

8. A truck as claimed in claim 7 wherein said connecting link consists of related sections, the end portions of which are endwise adjustably connected together.

9. A truck as claimed in claim 8 having stop means for limiting movement of said pedals comprising spaced first abutment means and second abutment means intermediate said spaced first abutment means adapted to engage and cooperate with said spaced first abutment means to limit the movement of said pedals in either direction, one of said abutment means being connected to said endwise movable link and the other of said abutment means being supported by said chassis.

10. A truck for translation in a mine or like areas having, in combination, a chassis, pairs of traction and steerable wheels for supporting said chassis, power means on said chassis for driving said traction wheels, a brake including a movable member for actuating said brake, a spring connected to said movable member and said chassis for biasing said movable member into a brake-released position, a pair of alined pedals pivotally mounted on said chassis, a rockshaft rotatably mounted on said chassis, a lever fixedly connected intermediate its ends to said shaft, links connecting said pedals to said lever at opposite sides and above and below the axis of said shaft, a cam member fixed to said shaft and having a cam with reversely related cam surfaces extending outwardly therefrom, a movable element normally in engagement with said cam and adapted to ride either of said cam surfaces when the cam is rocked by the operation of one of said pedals, linking means interconnecting said movable element and said movable member for moving the latter in opposition to said spring when said movable element rides either of said cam surfaces, said spring acting through said linking means and said movable element to urge said cam member to a normal brake released position when said movable element is in engagement with either of said cam surfaces and to urge said movable element into engagement with said cam member.

11. A truck as claimed in claim 10 wherein each of said cam surfaces terminates in a surface adapted to be engaged by said movable element when either of said pedals is operated to a predetermined position, the last-said surface being substantially normal to the force applied thereto by said movable element when in engagement therewith and due to the action of said spring whereby the brake is set in parked position.

References Cited in the file of this patent

UNITED STATES PATENTS

| Number | Name | Date |
| --- | --- | --- |
| 1,212,616 | Fageol | Jan. 16, 1917 |
| 1,384,073 | Lee | July 12, 1921 |
| 1,681,319 | Bartlett | Aug. 21, 1928 |
| 2,209,177 | Stoltz | July 23, 1940 |
| 2,298,448 | Arentzen | Oct. 13, 1942 |
| 2,301,144 | Russell | Nov. 3, 1942 |
| 2,325,731 | Arentzen et al. | Aug. 3, 1943 |
| 2,358,236 | Lee | Sept. 12, 1944 |
| 2,360,282 | Russell | Oct. 10, 1944 |
| 2,378,892 | Arentzen | June 26, 1945 |

FOREIGN PATENTS

| Number | Country | Date |
| --- | --- | --- |
| 148,365 | Great Britain | Nov. 25, 1920 |